UNITED STATES PATENT OFFICE.

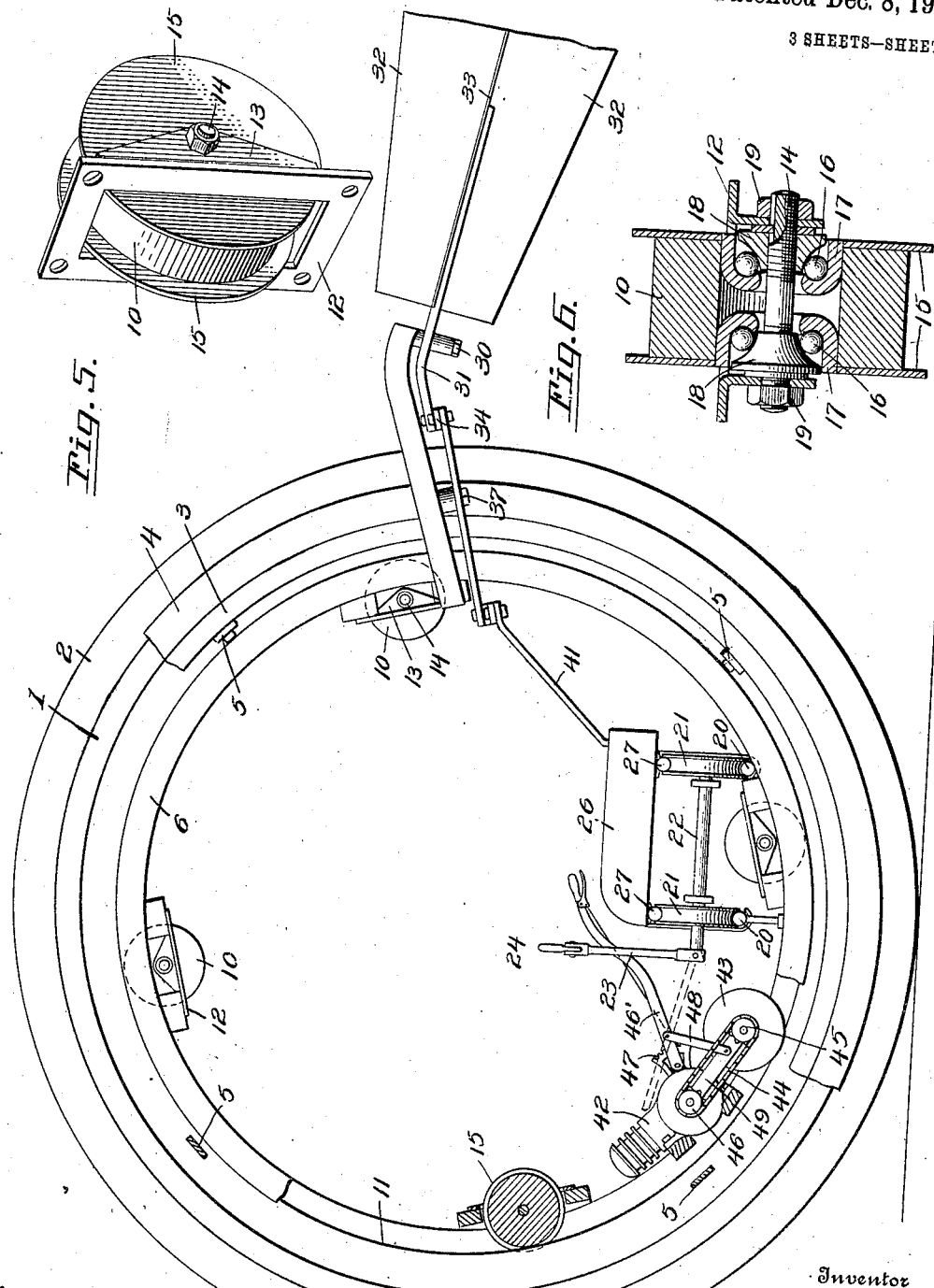

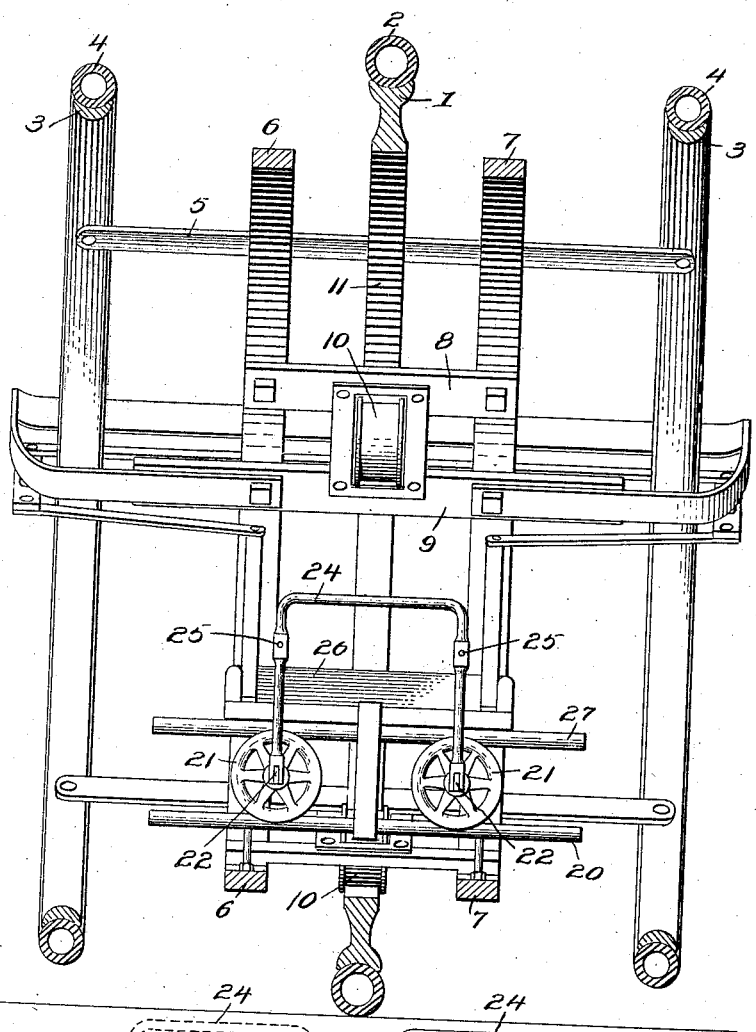
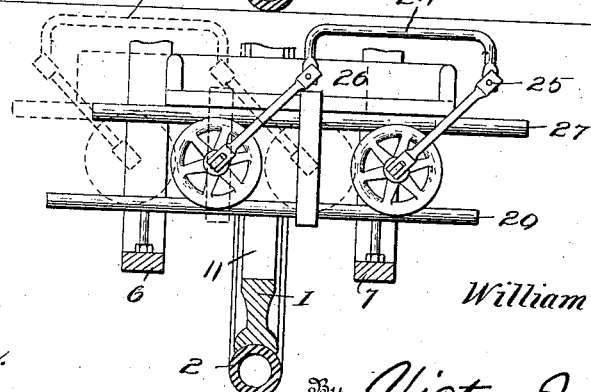

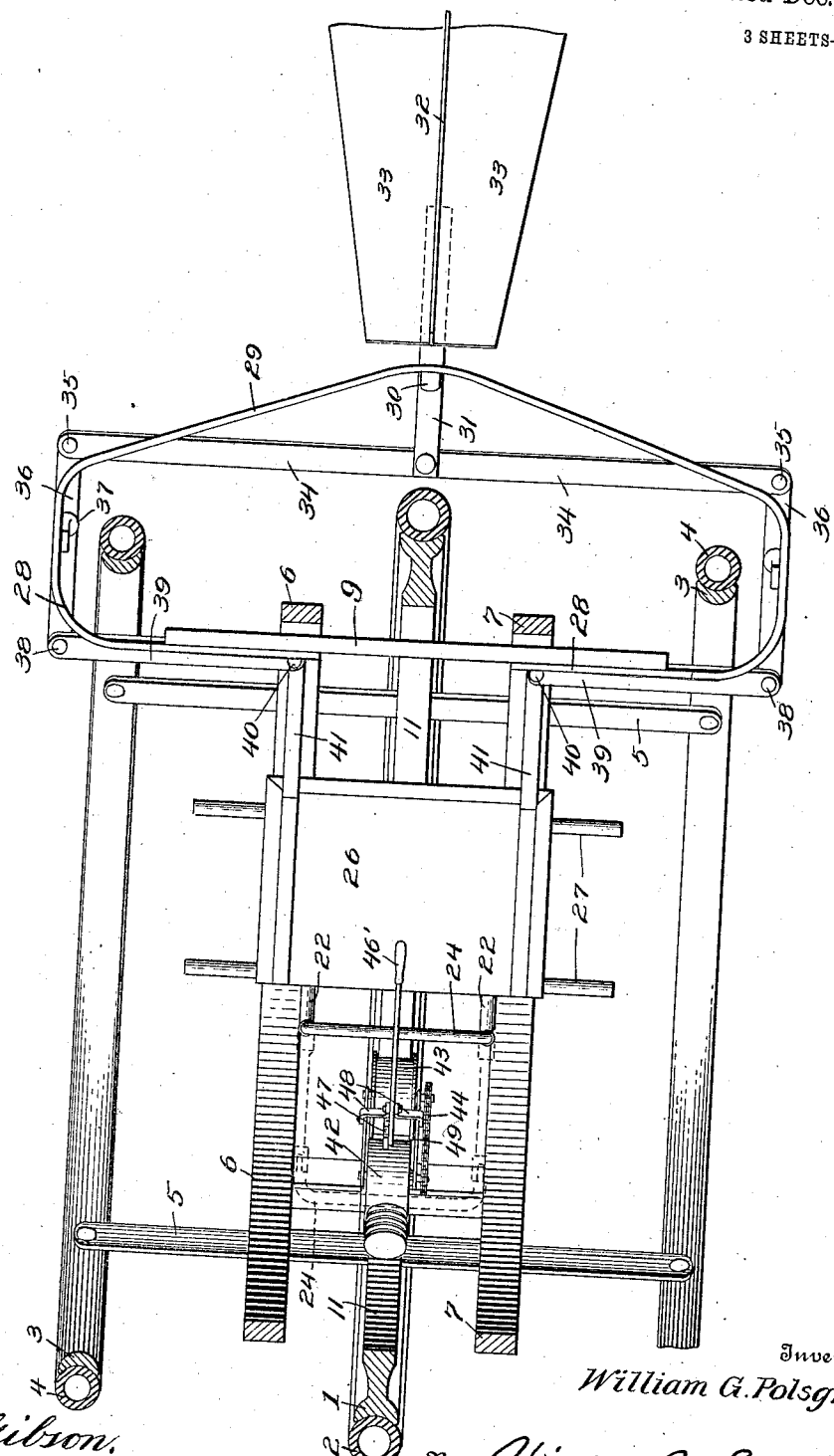

WILLIAM G. POLSGROVE, OF ROSWELL, TERRITORY OF NEW MEXICO.

VEHICLE.

No. 906,284.  Specification of Letters Patent.  Patented Dec. 8, 1908.

Application filed January 23, 1908. Serial No. 412,338.

*To all whom it may concern:*

Be it known that I, WILLIAM G. POLSGROVE, a citizen of the United States, residing at Roswell, in the county of Chaves and Territory of New Mexico, have invented new and useful Improvements in Vehicles, of which the following is a specification.

This invention relates to vehicles and the object of the invention is to provide a vehicle of the class known as unicycles embodying a large wheel within which the rider sits, the invention embodying a novel construction of wheel and balancing means therefor whereby the rider is enabled to have complete control of the machine in propelling and balancing and steering the same.

With the above general object in view, the invention consists in the novel construction, combination and arrangement of parts as herein fully described, illustrated and claimed.

In the accompanying drawings:—Figure 1 is a side elevation, partly in section, of a vehicle embodying the present invention. Fig. 2 is a vertical cross section through the same. Fig. 3 is a horizontal section through the machine. Fig. 4 is a detail cross section through the lower portion of the machine, showing the operation of the balancing mechanism. Fig. 5 is a detail perspective view of one of the guide rollers. Fig. 6 is a diametrical section through the same.

The machine contemplated in this invention comprises essentially a main center traction and carrying wheel the rim of which is designated at 1, the latter being provided with a tire 2 which may be of any desired construction either pneumatic or solid. At opposite sides of the main central wheel there is arranged side balancing and supporting wheels comprising rims 3 and tires 4, the side wheels being connected to the main central wheel by means of cross bars 5 whereby all of the wheels are braced relatively to each other and caused to revolve in unison. Each of the wheels above described is preferably of spokeless construction so as to enable the occupants of the vehicle to enter and leave the wheel frame on either side.

Mounted within the annular revolving wheel frame hereinabove described, there is arranged an annular seat frame comprising oppositely located rims 6 and 7 which are connected at suitable points by cross bars 8 and 9 to which are attached guide rollers 10 which travel against the inner face 11 of the rim or felly 1 of the main central traction and carrying wheel, whereby the inner frame is supported on the outer frame or wheel. These guide rollers may be arranged at any suitable intervals apart as indicated in Fig. 1 and each roller is preferably of the construction illustrated in detail in Figs. 5 and 6 in which it is seen to comprise a frame 12 having wings or flanges 13 which receive the shaft 14 of the roller. The roller is provided with opposite flanges 15 which straddle the guide rim 11 as indicated in Figs. 1 and 2, so as to prevent said rollers from becoming disengaged from the rim. Each of the rollers 10 is preferably provided with anti-friction bearings in the form of balls 16 arranged in ball cups 17 secured within the hub of the wheel, the balls being held in place and the bearing being made adjustable by means of cones 18, as clearly shown in Fig. 6, the bearing when adjusted, being held in adjusted condition by means of one or more jam nuts 19.

Extending transversely of the lower portion of the inner frame are parallel rails 20 secured in fixed relation to the inner or suspension frame and having mounted thereon two sets of rollers 21 mounted on parallel axles 22, each axle being provided with an upwardly extending lever arm 23 while the upper ends of the two lever arms are connected by a yoke or handle bar 24 which is pivotally connected to the arms 23 as shown at 25 whereby the horizontality of the handle bar 24 is preserved at all times.

26 designates the rider's seat which has secured thereto parallel rails 27 which rest and move on top of the wheels 21 as clearly indicated in Fig. 4 wherein the lateral movements of the seat are indicated by full and dotted lines. The rider, while occupying the seat 26 holds the handle bar 24 and by shifting the same to one side or the other he simultaneously shifts the seat 26 on which he is seated thus shifting his weight and changing the balance of the machine as a whole and causing it to lean to one side or the other. It may be stated here that when the machine is in perfect balance and being propelled along at the proper speed, it will follow the rectilinear path. When, however, the weight is shifted to one side or the other, the machine will follow a curvilinear path and the greater the degree of inclination of the machine the shorter will be the curve described thereby.

Secured to one of the cross bars 9 connecting the rims 6 and 7 of the inner frame are the inturned ends 28 of a steering frame 29 which extends around the side balancing and supporting rims 3 and is provided with a bearing stud 30 on which is fulcrumed a steering head 31 which carries a steering vane or rudder preferably of cruciform shape in cross section embodying vertical wings 32 and horizontal wings 33. The rudder or vane extends outward from the rear of the machine and the steering head 31 thereof extends ahead of the stud 30 where it has connected thereto a connecting bar 34 the opposite ends of which are pivotally connected at 35 to side levers 36 fulcrumed intermediate their ends on the steering frame at the points 37. The opposite or forward ends of the levers 36 have pivotally attached thereto at 38, connecting bars 39 which extend inward and are connected pivotally at 40 to a pair of arms 41 rigidly connected to and extending backward from the seat 26 so that when the seat is shifted to one side or the other of the machine, the tail vane or rudder will be correspondingly shifted to the same side, the rudder thus assisting the driver of the machine in the steering operation. It will be understood that the rudder may be made of suitable size to give the necessary air resistance surface for the purpose stated.

The machine may be driven by any suitable motor 42 which has been conventionally shown in Figs. 1 and 3, the preferred driving gear embodying a friction wheel 43 adapted to travel in contact with the rim 1 and being actuated by means of a sprocket chain 44 running around sprocket wheels 45 and 46 on the wheel 43 and the engine shaft, as clearly shown in Fig. 1. 46' designates a hand lever having a thumb latch engagement with a rack segment 47 for holding the lever at any desired point of adjustment and said lever is connected by means of a link 48 to the connecting bar 49 which extends between the engine shaft and the shaft of the friction roller 43, said lever which is arranged within convenient reach of the driver in the seat 26 enabling him to instantly throw the driving mechanism into and out of engagement with the rim or felly.

It will, of course, be understood that the machine hereinabove described is susceptible of various changes in the form, proportion and minor details of construction and I, therefore, reserve the right to make such changes as properly fall within the scope of the appended claims.

It will be noted that the side or lateral supporting wheels are of less diameter than the main central supporting wheel to permit the turning of the vehicles as a whole and also to form supporting means for the vehicle while standing still or when moving slowly, as in starting and stopping the machine. As soon as the machine develops the necessary speed of momentum, it will immediately right itself so as to travel on the main central carrying wheel with both of the lateral supporting wheels out of contact with the ground. Furthermore, the machine is particularly adapted for traveling over sandy roads, the carrying wheel being of a size which prevents the same from sinking to any appreciable depth in the sand. Furthermore, the machine as a whole may be constructed so as to be very light which adds to its efficiency in traveling over soft or sandy road-ways.

Having thus described the invention, what is claimed as new, is:—

1. A vehicle comprising a main carrying wheel, an operator's seat located within said wheel, and means for shifting said seat laterally including seat supporting wheels, guide rails for said wheels and a shifting lever.

2. A vehicle comprising a main carrying wheel, an operator's seat located within said wheel, and means for shifting said seat laterally including a guide rail, rollers on which the seat moves, and means for moving said rollers.

3. A vehicle comprising a main carrying wheel, a suspension frame therein, an operator's seat supported by said frame within the carrying wheel and adapted to be shifted laterally with respect to the plane of the wheel, and a rudder connected with said frame.

4. A vehicle comprising a main carrying wheel, a suspension frame therein, an operator's seat supported by said frame within the carrying wheel and adapted to be shifted laterally with respect to the plane of the wheel, and an air resistance rudder connected with said frame.

5. A vehicle comprising a main carrying wheel, a suspension frame therein, an operator's seat supported by said frame within the carrying wheel and adapted to be shifted laterally with respect to the plane of the wheel, a rudder frame connected with the suspension frame and embracing the wheel rim, and a rudder jointed to said rudder frame.

6. A vehicle comprising a main carrying wheel, a suspension frame therein, an operator's seat supported by said frame within the carrying wheel and adapted to be shifted laterally with respect to the plane of the wheel, and a rudder operatively connected with and movable by the seat.

7. A vehicle comprising a main carrying wheel, a suspension frame therein, an operator's seat supported by said frame within the carrying wheel and adapted to be shifted laterally with respect to the plane of the wheel, and a motor arranged within the rim of said wheel and comprising a driven wheel and means for throwing said driven wheel into and out of driving engagement with the main carrying wheel.

In testimony whereof I affix my signature in presence of two witnesses.

WILLIAM G. POLSGROVE.

Witnesses:
A. E. REESE,
K. ALLEN.